(12) United States Patent
Casati et al.

(10) Patent No.: US 7,403,985 B2
(45) Date of Patent: Jul. 22, 2008

(54) METHOD AND SYSTEM FOR ANALYZING ELECTRONIC SERVICE EXECUTION

(75) Inventors: Fabio Casati, Palo Alto, CA (US);
Ming-Chien Shan, Saratoga, CA (US);
Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1415 days.

(21) Appl. No.: 09/985,081

(22) Filed: Nov. 1, 2001

(65) Prior Publication Data

US 2003/0084142 A1    May 1, 2003

(51) Int. Cl.
*G06F 15/173* (2006.01)
(52) U.S. Cl. .................... 709/223; 709/224; 706/45; 706/46; 706/47
(58) Field of Classification Search ............. 709/223, 709/224; 702/186; 714/4; 706/45–47
See application file for complete search history.

(56) References Cited

U.S. PATENT DOCUMENTS

| | | | | |
|---|---|---|---|---|
| 5,983,224 A | * | 11/1999 | Singh et al. .................. 707/6 |
| 6,094,645 A | * | 7/2000 | Aggarwal et al. ............ 706/47 |
| 6,247,050 B1 | * | 6/2001 | Tso et al. .................... 709/224 |
| 6,336,138 B1 | * | 1/2002 | Caswell et al. .............. 709/223 |
| 6,341,310 B1 | * | 1/2002 | Leshem et al. ............... 709/223 |
| 6,360,332 B1 | * | 3/2002 | Weinberg et al. ............. 714/4 |
| 6,477,483 B1 | * | 11/2002 | Scarlat et al. ............... 702/186 |
| 6,549,944 B1 | * | 4/2003 | Weinberg et al. ............. 709/224 |
| 6,553,359 B1 | * | 4/2003 | Schwenkreis ................ 706/46 |
| 2003/0005111 A1 | * | 1/2003 | Allan ......................... 709/224 |
| 2003/0069962 A1 | * | 4/2003 | Pandya ....................... 709/224 |

OTHER PUBLICATIONS

Bulletin of the technical committee on: Data Engineering, IEEE Computer Society, vol. 24 No. 1, Mar. 2001, p.p. 1-76.

* cited by examiner

*Primary Examiner*—Liangche A Wang

(57) ABSTRACT

A method is disclosed for analyzing quality of an electronic service (e-service), such as an Internet-based service, hosted by an e-service platform. The provider or separate administrator defines quality of e-service execution by creating quality index records stored in an e-service warehouse. The quality index records allow assigning quality indexes to e-service execution based on specified parameters related to service execution, such as parameters related to transaction duration. As e-services are executed, service data is stored in a log. The service data is processed by an extract-transfer-load (ETL) engine that transfers data from the log to the warehouse. The data is mapped to quality indexes for analysis. The data can be viewed with a reporting tool, such as a dedicated console or a commercially-available analysis tool. Using the tool, the administrator can identify patterns corresponding to poor execution quality and can attempt to resolve the problems. Classification and prediction models are also created and stored to analyze past transactions and to predict behavior of future transactions. The models can be used to re-design the e-service execution and/or can be used at run-time to optimize e-service execution.

18 Claims, 11 Drawing Sheets

METHOD AND SYSTEM FOR ANALYZING ELECTRONIC SERVICE EXECUTION

FIELD OF INVENTION

The present invention relates generally to software systems for computer networking. More particularly, it relates to a software system for monitoring, analyzing, predicting, and improving quality performance of electronic services provided via a computer network.

BACKGROUND

In the field of electronic services (e-services), service providers seek to provide the services in an efficient and desirable manner to the user, or client. E-services include, for example, electronic web services provided via a global computer network, such as the Internet, as well as services provided independent of the Internet. Examples of conventional e-services include delivery of customized news and stock market updates, on-line ticket reservations, monitoring of flight statuses, and electronic advertisements.

One benefit of the e-services environment is that clients can dynamically identify the available web service that meets his or her needs, can examine the properties of the web service, and can determine how to access the service. Additionally, low-cost web services platforms and low-cost registration on web directories have emerged, allowing small providers to compete with larger providers in the e-services marketplace. Web services for both large and small providers may be listed in the same directories, and users can access e-services and e-service provider information to select an e-service based on quality and cost.

In this competitive environment, it is desirable for providers to deliver services with high, consistent, and predictable quality. Quality in this context includes both internal and external quality. Internal quality refers to quality as judged from the perspective of the provider, including such factors as operating costs. External quality refers to quality as judged from the perspective of the user, including such factors as speed, on-time delivery, low cost, and ease of access to the service.

Quality problems occur from a variety of sources. For example, an e-service such as a car rental service may involve multiple stages such as stages for browsing vehicles, selecting a vehicle, and paying for the vehicle. One or more of these stages may create a bottleneck that hinders performance and therefore quality of the service. In another case, the e-service may be overwhelmed by service requests from a particular origin or at a particular time of the day or week. For example, some services such as stock market updates may receive significant use during week days, but less use on weekends. The peak usage times may diminish quality in terms of user response time, if they are not handled properly. It is therefore desirable to analyze e-service execution and to identify quality problems.

Currently, providers have limited tools at their disposal to understand and analyze service execution to improve quality. What is needed is a way of analyzing e-services provided to a user to identify sources of quality problems and to remove those sources. What is also needed is a method and system for predicting e-service behavior based on previous transactions.

SUMMARY OF INVENTION

A method is disclosed for analyzing quality of an electronic service (e-service), such as an Internet-based, or other network-based, service, hosted by an e-service platform. A service provider or administrator defines quality of e-service execution by creating quality index records stored in an e-service warehouse. The quality index records allow assigning quality indexes to e-service execution based on specified parameters related to service execution, such as parameters related to transaction duration. As e-services are performed, service execution data is stored in a log. The service data is processed by an extract-transfer-load (ETL) engine that extracts selected service data from the log and transfers it to the warehouse. The warehouse holds raw data for individual instances of e-service executions, aggregated data for multiple executions, and defined functions for calculating other characteristics of aggregated transaction data, such as averages and ranges. The data is labeled with quality indexes as defined by the quality index records. The data is formatted to be viewed with a dedicated console or a commercially-available analysis tool. Using the tool, the administrator can identify patterns resulting in poor execution quality and can attempt to resolve the problems. Also based on the analysis, classification and prediction models are created and stored to predict behavior of future transactions. The models can be used to re-design the e-service execution and/or can be used at run-time to optimize e-service execution.

A system is also disclosed for analyzing e-service transactions. The system retrieves service execution data from logs using an extract-transfer-load (ETL) engine. The ETL engine extracts data from the execution logs, loads the data into a data warehouse, and computes quality indexes based on the defined quality index records. The warehouse includes a data store for the raw data for individual instances of transactions, and a data store that holds aggregate data as well as defined functions for aggregating the raw data for analysis. An e-services intelligence (ESI) engine retrieves the data from the warehouse and prepares it for analysis by a reporting tool, such as commercially-available software application or a dedicated console. The ESI engine computes quality indexes for transaction data. The reporting tool uses the quality indexes to analyze the performance of the e-services.

DETAILED DESCRIPTION

Figure 1:
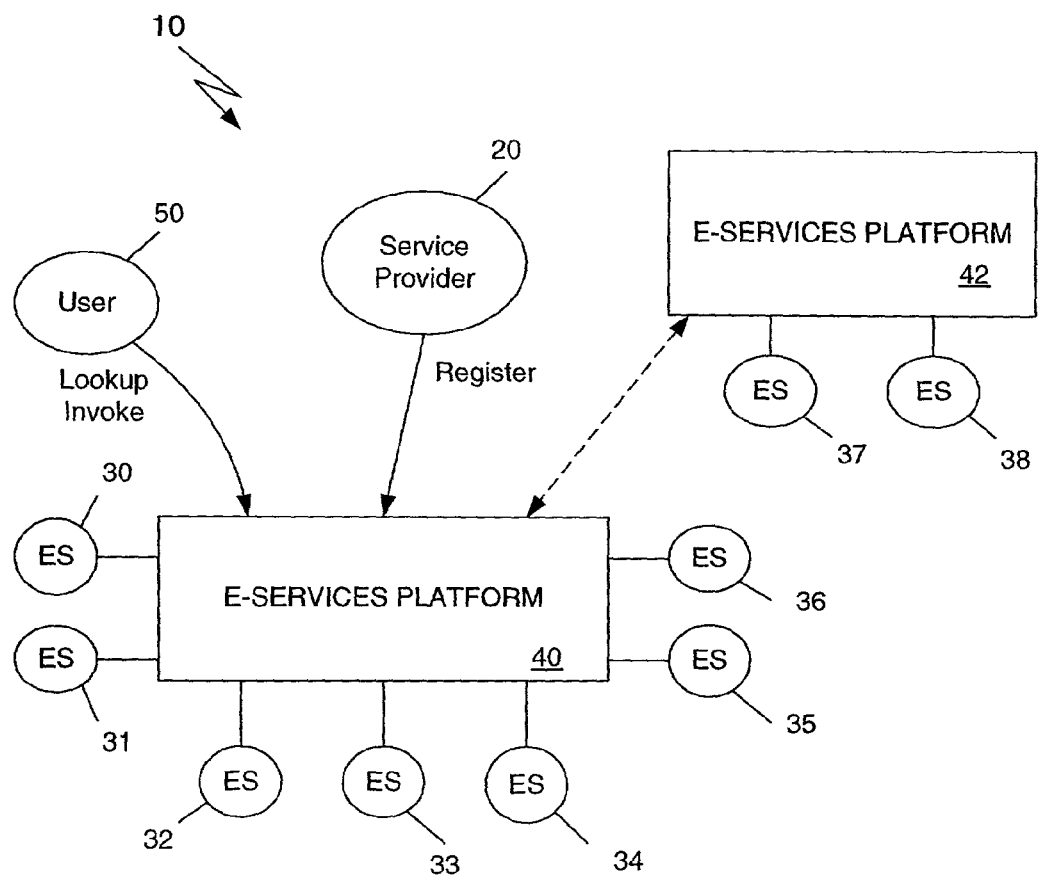
FIG. 1 shows a block diagram of an e-service system to be analyzed by the method.

FIG. 1 shows an example system 10 for providing electronic services (eservices) to users. Examples of e-services and e-service platforms are described more fully in F. Casati, Ming-Chien Shan, *Definition, Execution, Analysis, and Optimization of Composite E-Services*, Bull. Tech. Comm. on Data Engineering, Vol. 24, No. 1 (March 2001), p.31, which is hereby incorporated by reference. Various software vendors including BEA, WebMethods, Sun Microsystems, Microsoft, and Hewlett-Packard Company, and consortiums including Oasis and UDDI have provided models, languages, and interfaces for describing e-services and for making them available to users. Such frameworks typically allow the specification of business functions or applications in terms of their properties, which can be generic (such as the service name and location) or service-specific (such as the car size for a car rental e-service). Depending upon the framework, the properties may be represented by, for example, Java vectors or XML documents.

In addition, vendors provide software platforms 40, 42 (referred to as e-service platforms (ESPs) or web service platforms) that allow service providers 20 to register and advertise their services 30-38 and to allow authorized users 50 to look up and access registered services 30-38. Examples of such platforms 40, 42 include the BEA WebLogic Collaborate, WebMethods Enterprise, Sun Jini, Microsoft net, and Hewlett-Packard e-speak. As shown in FIG. 1, e-services 30-38 are controlled by one or more interconnected e-services platforms 40, 42. Service providers 20 register services 30-38 with the platforms 40 to make the services 30-38 available to clients 50, also referred to as users 50. The client 50 invokes a look-up function to access one or more of the services 30-38 through the platform 40. These approaches allow uniform representation, search, and access of business applications, both those used for internal operations and those that are made available to users 50, for example via the Internet.

To make the services 30-38 searchable and accessible to users 50, service providers 20 register a service definition with the platform 40 and, in one embodiment, with advertising services as well. As part of the registration process, the service provider 20 gives information about the service 30-38, such as the service name, the methods (operations) that can be performed on the service 30-38 along with their input/output parameters, or the list of authorized users. In many service models, a service may provide several methods (operations) to be invoked as part of its interface. For instance, a emusic service may allow users to browse or search the catalog, to listen to songs, or to buy discs or mp3 files. To achieve its goal, users may be required to invoke several methods of a service. The set of interactions needed to achieve a business goal is referred to as a conversation. Advanced platform models support the notion of conversation and allow service developers to define conversation and conversation-specific properties, such as security requirements or constraints among the order of method invocation within a conversation.

The provider 20 also specifies a handler for the service 30-38. A handler is an application that is contacted in order to request service executions. Depending upon the service model and the platform 40, the service handler can be identified by a Uniform Resource Identifier (URI) (such as in e-speak) or by giving a proxy Java object that will take care of contacting the handler (such as in this Jini application manufactured by Sun Microsystems). Customers may look for available service by issuing service selection queries over service directories, also referred to as brokers. Queries may simply search service by name, or can include more complex constraints on the service properties as well as ranking criteria if multiple services satisfy the search criteria. Service selection queries return a reference to one or more services that can be used to invoke them.

Platforms 40 may also provide "middleware" functionalities for business-to-business integration. Under this perspective, they can be thought of as an extension of traditional message brokers and Enterprise Application Integration (EAI) suites. Although the system is described with respect to web services, the same concepts apply to many middleware applications, including message brokers, workflows, application servers, enterprise java beans (EJB), and traditional common object request broker architecture (CORBA). In other embodiments, e-services 30-32 may be deployed on top of simple platforms 40 that do not support registration, look-up, and middleware functionalities.

Figure 2:
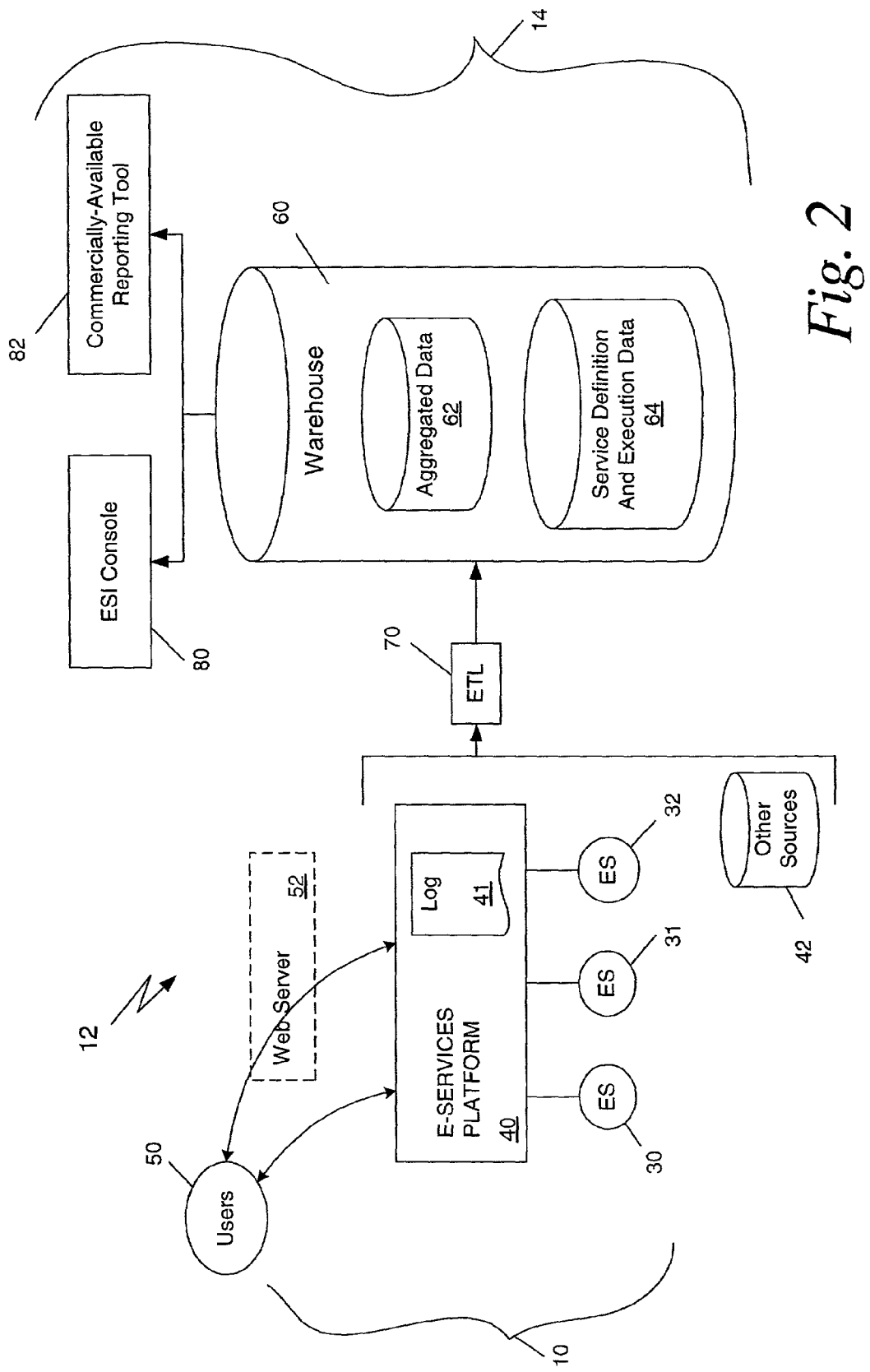
FIG. 2 shows a block diagram of the system analyzing e-service performance.

FIG. 2 shows an example e-services system 12 under analysis. The e-services platform 40 hosts several e-services 30-32. Users 50 access these services 30-32 by connecting to the platform 40 directly or through a web server 52. Users 50 may be both humans or other computer systems, for example in business-to-business e-services. As the e-services 30-32 are executed, data packets are transferred between the user 50 and the platform 40 pursuant to a communications protocol. Service data related to the execution of e-services 30-32 is stored in a log 41 maintained by the platform 40. As used herein, service data refers to any data related to the execution of e-services 30-32 and may include, for example, data related to individual data packets transferred between the user 50 and the platform 40 during the execution of an e-service 30-32.

Service data is transferred from the log 41 to an electronic service warehouse (ESW) 60, using an extract-transfer-load (ETL) engine 70. As used herein, the term warehouse refers to any data store including, for example, one or more databases. The ETL engine 70 extracts service data from the log 41 and other sources 42, transfers the service data to the data warehouse 60, and loads the data into a data structure that has been pre-defined to analyze desired characteristics of the service execution. The other sources 42 include data provided to the ETL engine 70 that is not part of the execution log 41. For example, other sources data may include general information related to a particular e-service 30-32. The other sources 42 data may also include quality index definitions, described herein. The service definition and execution database 64 of the warehouse 60 stores raw service data retrieved from execution logs 41, after being processed by the ETL engine 70.

The ESW 60 also includes an aggregated data database 62 that stores aggregate data as well as definitions for analyzing the raw data in the service definition and execution database 64. The aggregated data includes service data related to a plurality of executions of the e-service. In the embodiment shown in FIG. 2, data related to individual transactions is stored in the service definition and execution database 64, and the aggregated database 62 defines "functions" or other means of analyzing the specific data. For example, the aggregated data database 62 may specify a function for calculating the average execution time for a specific process in an e-service 30-32. The function defined in the aggregated data database 62 extracts the underlying data from the service definition and execution database 64 to calculate the average execution time, in this example. In one embodiment, the aggregated data database 62 includes common functions used in analysis. More specific, user-defined functions or analyses may be conducted using separately using analysis tools, described herein. The analysis tools may use the functions defined in the aggregated data database 62 as part of user-defined functions.

The service data is reported for analysis using either a dedicated e-service intelligence (ESI) console 80 or a commercially-available reporting tool 82, such as Microsoft Excel or an on-line analytical processing (OLAP) tool. The person or computer system analyzing the service data, referred to herein as the administrator, analyzes the service data using quality indexes, described herein. In one embodiment, the administrator may be part of the e-service provider 20, while in other embodiments the administrator may be a separate entity. Various transaction characteristics are given scores, referred to as quality indexes, for judging their quality. For example, the warehouse 60 may store service data related to characteristics of execution time, on-time delivery, etc. The administrator may also define, or "score," various quality levels associated with the characteristics. For example, on-time delivery beyond a first threshold but within a second threshold may be associated with a first quality score, while an on-time delivery beyond both thresholds may be associated with a second score, if on-time delivery is a characteristic under test. Parameters for numerous characteristics may be defined as part of the quality analysis, and various quality indexes may be given for different combinations of characteristics. In this format, the analysis can quickly and easily identify e-service execution characteristics associated with low quality so that adjustments may be made.

Figure 3:
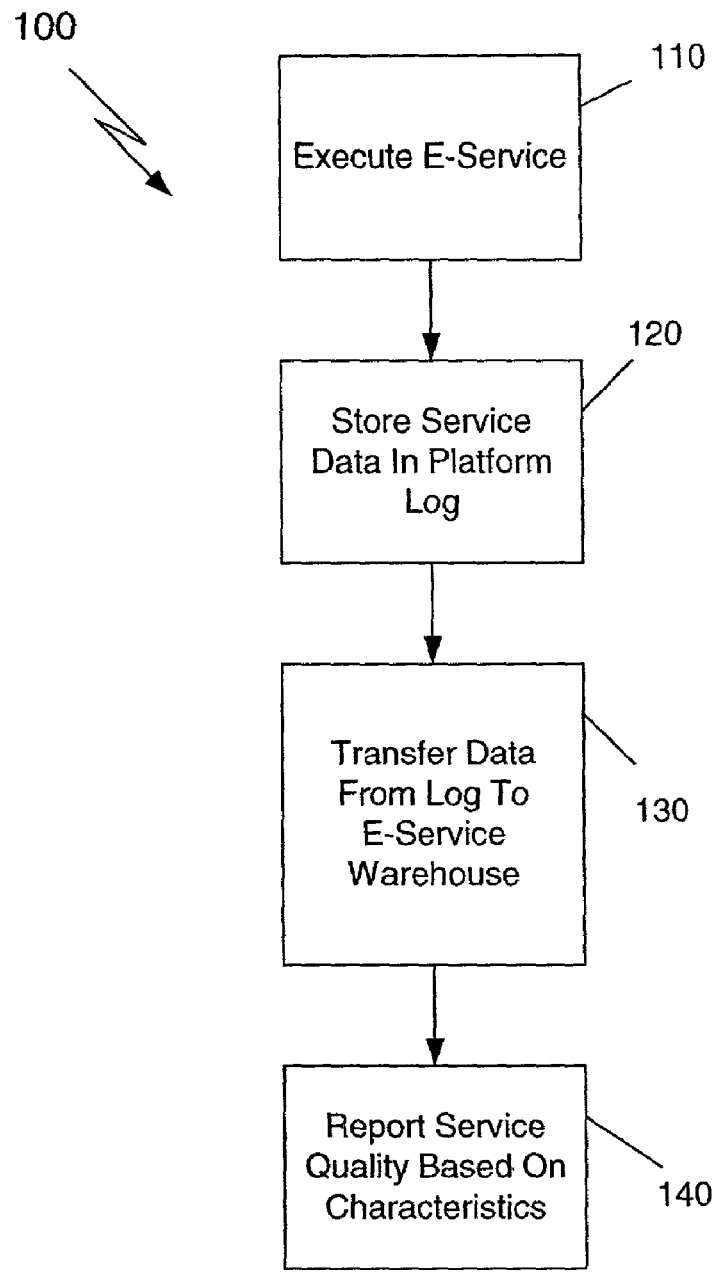
FIG. 3 shows a flow chart of a method consistent with the present invention.

FIG. 3 shows a flow chart of the method 100 used by the system 12 shown in FIG. 2 to analyze the performance of an e-service 30-32. An e-service 30-32 is executed 110 numerous times by various users 50. Service data related to each of the executions is stored 120 in a log 41 at the e-service platform 40. E-services 30-32, and particularly web services, typically interact with users 50 by exchanging extensible mark-up language (XML) documents. The service data is transferred 130 from the log 41 to a e-service warehouse 60 that stores the service data in an aggregated data location 62. In one embodiment, the service data is transferred 130 periodically. In another embodiment, the service data is transferred 130 manually, when desired by an administrator. In one embodiment, the warehouse 60 stores the execution data and functions that calculate aggregated data characteristics.

In one embodiment, the system considers the individual sending or receiving of documents as the facts of data warehouse 60, because these are the events of interest that users want to analyze or mine in order to extract knowledge related to service executions and to support business decisions. In an alternative embodiment, the system considers a document exchange—that is, a pair of XML documents, the request and the reply—to be the fact, because in many cases invocation of a service's business function includes an XML request and reply. For those document exchanges that follow more complex patterns, such as request-acknowledge-reply or request only, and for asynchronous exchanges, the former convention may be used. Other facts stored in the warehouse 60 may include data, conversations, and behaviors. Data facts store data items included in XML documents sent or received, or subsets of the data items.

The service data is then reported 140 to the administrator using a dedicated console 80 or a commercially-available reporting tool 82. The reporting tool 80, 82 shows patterns of transactions having good or bad quality, as defined by the administrator, shows patterns with other data related to the service, and reports the results. For example, service data may include the client's location, the time of day or week, the type of transaction, the stage of a transaction in a transaction having multiple stages, the supplier of services for a transaction, etc., and the system 12 will report 140 any patterns that emerge in terms of high or low quality, as associated with the transaction properties. The service data may be reported 140 with a dedicated ESI console 80 or with a commercially available reporting tool 82. The results may then be analyzed to determine causes of poor quality service. The reporting tool 82 or console 80 can assess quality of transactions as cross-referenced by the other data, such as that identified above. For example, the reported output allows analysis of quality based on users' locations, transaction times, etc.

In one embodiment, the method makes no assumptions regarding the definition of "good" or "bad" service execution. "Quality" is defined by the provider 20 or by the administrator, and the method simply gathers data on service execution and applies the provider's definition to judge the service execution quality. The service provider specifies the quality criteria that he or she wants to monitor and analyze. For example, a provider of a supply-chain management service may consider "on-time delivery" as a significant quality parameter, and would therefore be interested in understanding why delays happen and what causes them. Service execution analysis may reveal that delays occur whenever a specific supplier is involved, or whenever there is the need of fulfilling complex orders that include products from more than three suppliers. Understanding the causes of problems can assist the information technology (IT) manager and business manager to identify the changes required to avoid future occurrences of the undesired situation. In one embodiment, the service provider 20 or administrator defines quality using data structures that define quality index records and allow the method to assign quality indexes, or "scores," to service data executions based on particular characteristics of the executions. Any characteristics related to any aspect of e-service execution may be analyzed. As used herein, a quality index refers to any measure of any aspect of e-service execution. The quality index may be assigned by a quality index record, which includes any type of data structure that holds data related to characteristics of execution.

Figure 4A:
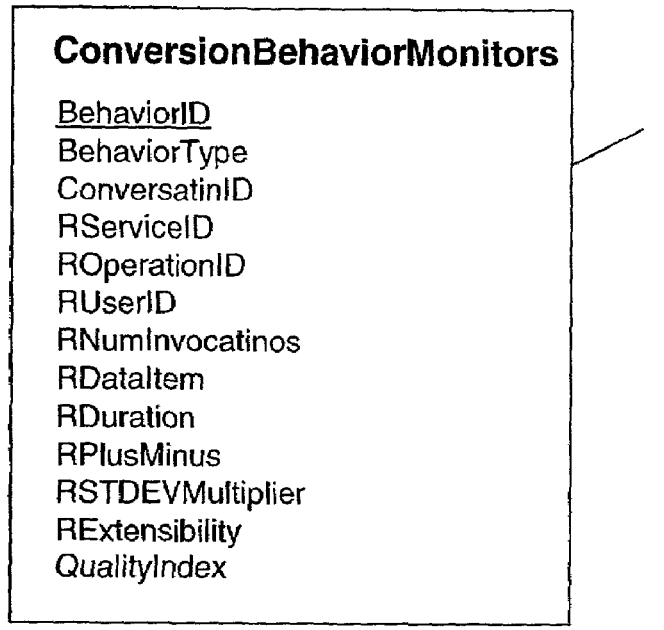
FIGS. 4A and 4B show an example data structure and record for data to be analyzed.
Figure 4B:
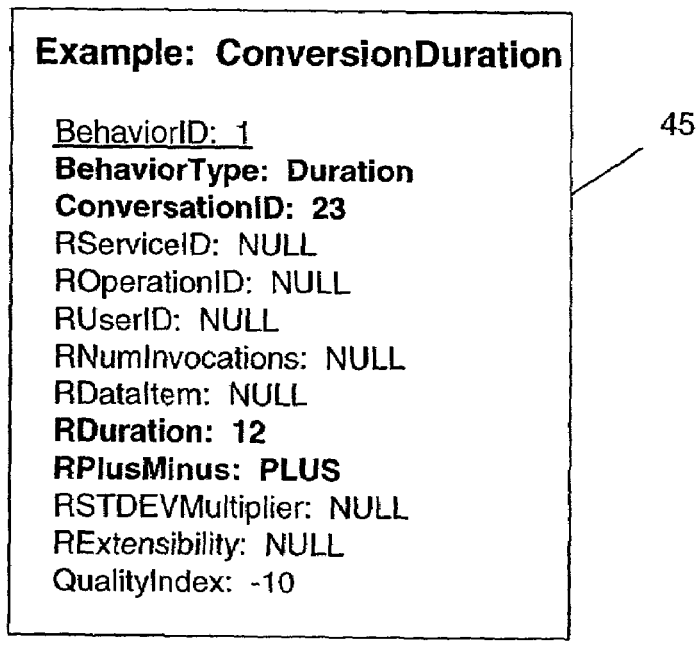

FIGS. 4A and 4B show examples of records 44, 45 that define quality index records specified by the provider or administrator for analysis of the service data. The records 44, 45 may be stored in the "other sources" data structure 42 shown in FIG. 2, or they may be introduced to the system at another point. The quality index records 44, 45 allow the provider 20 or administrator to define quality of e-service execution based on one or more particular characteristics of the transaction.

FIG. 4A is a generic data structure 44 that has been labeled "ConversationBehaviorMonitors" and includes a number of fields, namely BehaviorType, ConversationID, RServiceID, RoperationID, RUserID, RNumInvocations, RDataItem, RDuration, RPlusMinus, RSTDEVMultiplier, RExtensibility, and a QualityIndex. Each of these fields is a field from which a quality index record may be created by further specifying some or all of these fields, as shown in FIG. 4B. As used herein, a conversation refers to a series of interactions between a user 50 and an e-service platform 40 that occur during the execution of an e-service 30-32.

FIG. 4B shows a record 45 with data inserted to define a quality index based on the specified parameters. In this example, the record 45 is labeled "BehaviorID: 1." The record shown in FIG. 4B assigns a Quality Index value of −10 for conversations of type 23 (defined as a selected one of different conversation types for an e-service) that last more than 12 minutes. For this index record, fields are specified for BehaviorType, ConversationID, RDuration, RPlusMinus, and QualityIndex. The example of FIG. 4B is for a record that defines quality of an e-service in terms of the duration of the service. The BehaviorType field refers to the type of behavior for which a quality index is defined in the record, and is set to "Duration" in the example. The ConversationID field refers to a unique identifier that corresponds to a specific type of conversation of interest. The RDuration field refers to the duration of the transaction, and is set at 12 minutes in the example shown. The RPlusMinus field refers to a greater or less than indicator for the duration. The remaining fields are not used, as indicated by the NULL entries. For e-service executions meeting these criteria—that is, having a type 23 conversation lasting more than 12 minutes—a quality index of −10 is assigned. Similar quality index records may define quality for type 23 conversations lasting longer or shorter times, may define quality in terms of the duration of other conversation types, may include other fields, or may define quality in terms entirely unrelated to conversation duration.

The unused fields in the example of FIG. 4B, include RServiceID, RoperationID, RUserID, RNumInvocations, RDataItem, RSTDEVMultiplier, and RExtensibility. In this example, RserviceID refers to an identifier of a specific service; ROperationID refers to an identifier for a particular operation within a service; RUserID refers to an identifier for a user; RNumInvocations refers to the number of times a particular operation is called (for example, the calling of the same operation numerous times may indicate a glitch); RDataItem refers to a particular item of data; RSTDEVMultiplier refers to a multiplier of a standard deviation (for example, to evaluate those transactions that exceed the average plus the standard deviation of transaction time for similar transactions); RExtensibility refers to a generic field to be supplied by the administrator.

Figure 5:
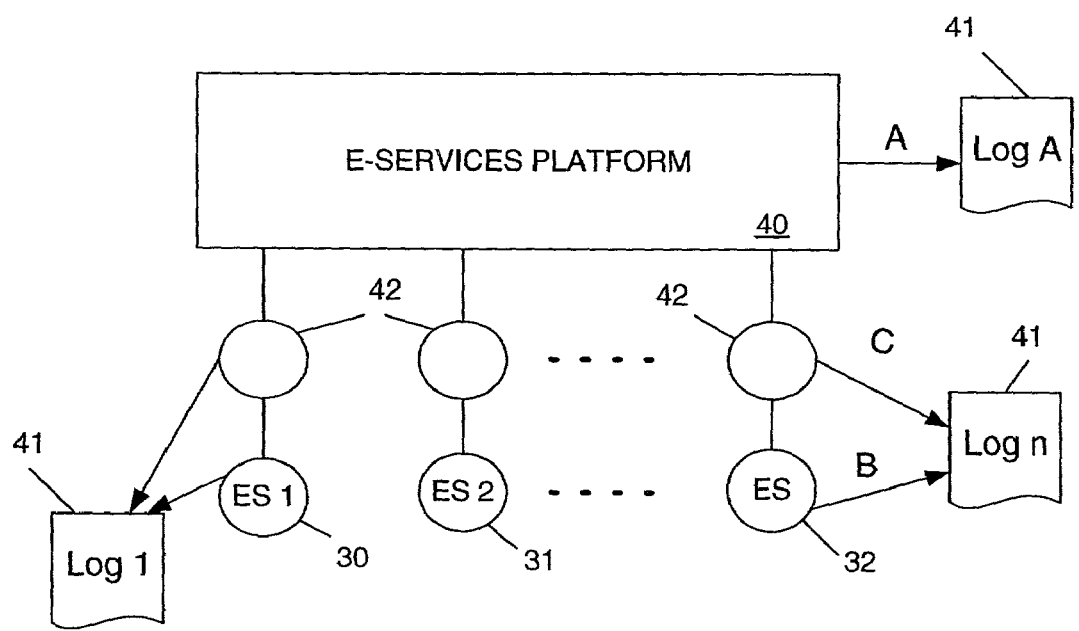
FIG. 5 shows a block diagram of systems for creating logs to store service data.

FIG. 5 shows a block diagram illustrating the creation of logs 41 storing service data at the e-services platform 40. Logs 41 are formed for each of the e-services 30-32 hosted by the platform 40, and may be formed in at least three different ways, as illustrated by the letters A, B, C. In many conventional e-service platforms 40, the platform 40 automatically maintains a log 41, as indicated by letter A. If the platform 40 maintains its own log 41, then this log 41 is used to analyze the e-service performance. Alternatively, if the platform 40 does not maintain a log 41, then the e-service 30-32 may create a log 41 as part of its execution, as indicated by letter B. If the e-service 30-32 maintains a log 41, then that log 41 is accessed through the provider 20 and used. If neither the platform 40 nor the provider 20 maintain a log 41, then a proxy 42 is created between the e-service 30-32 and the platform 40 to create a log 41 based on data created during execution of the e-service 30-32, as indicated by letter C. The proxy 42 shown in FIG. 5 is not part of the first two implementations, A and B.

Figure 6A:
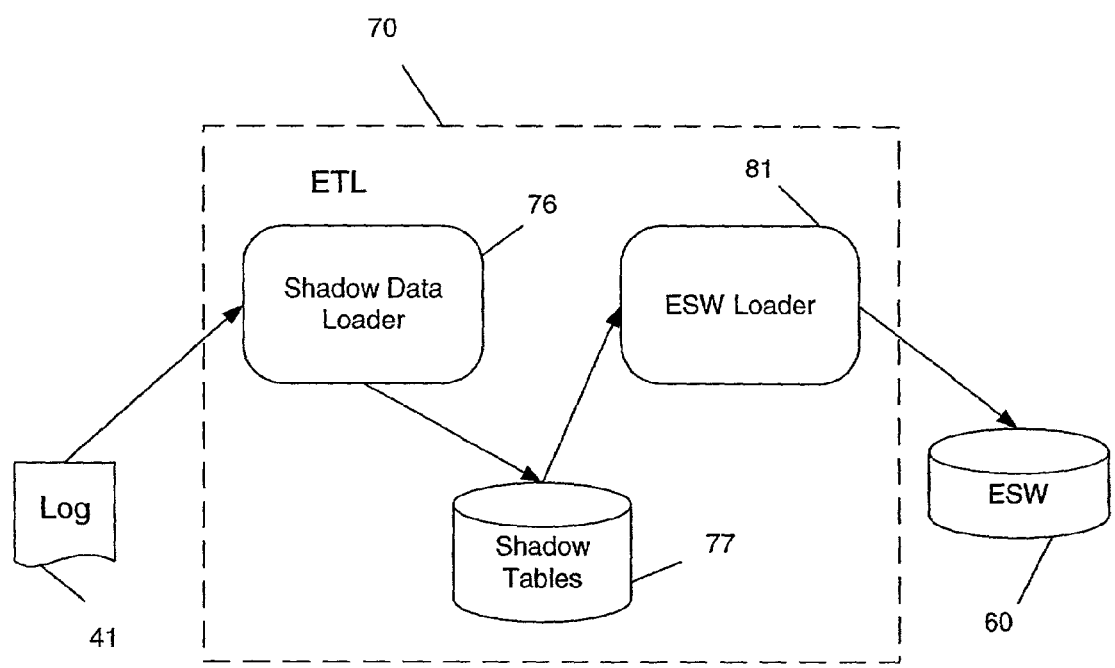
FIGS. 6A and 6B show block diagrams of systems for transferring data from service logs to an e-service warehouse database.
Figure 6B:
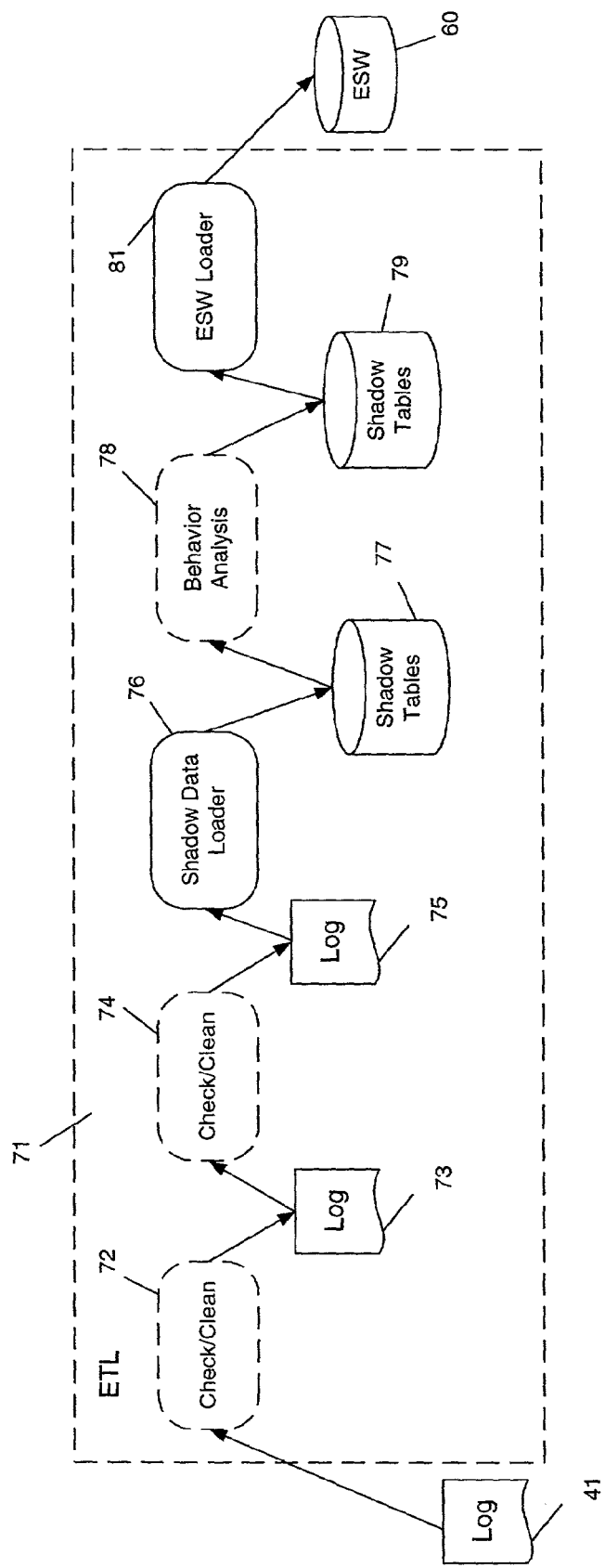
Figure 7A:
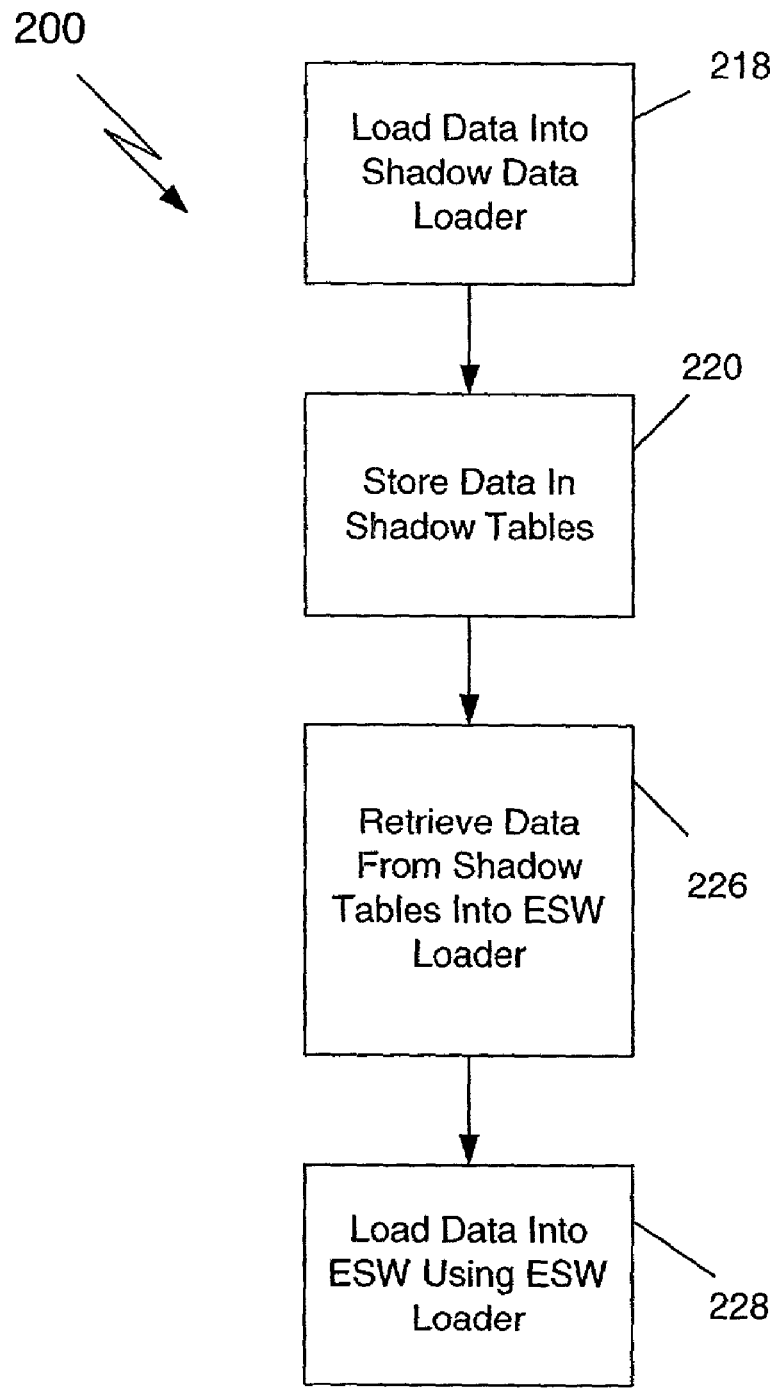
FIGS. 7A and 7B show flow charts of methods performed by the systems shown in FIGS. 6A and 6B.
Figure 7B:
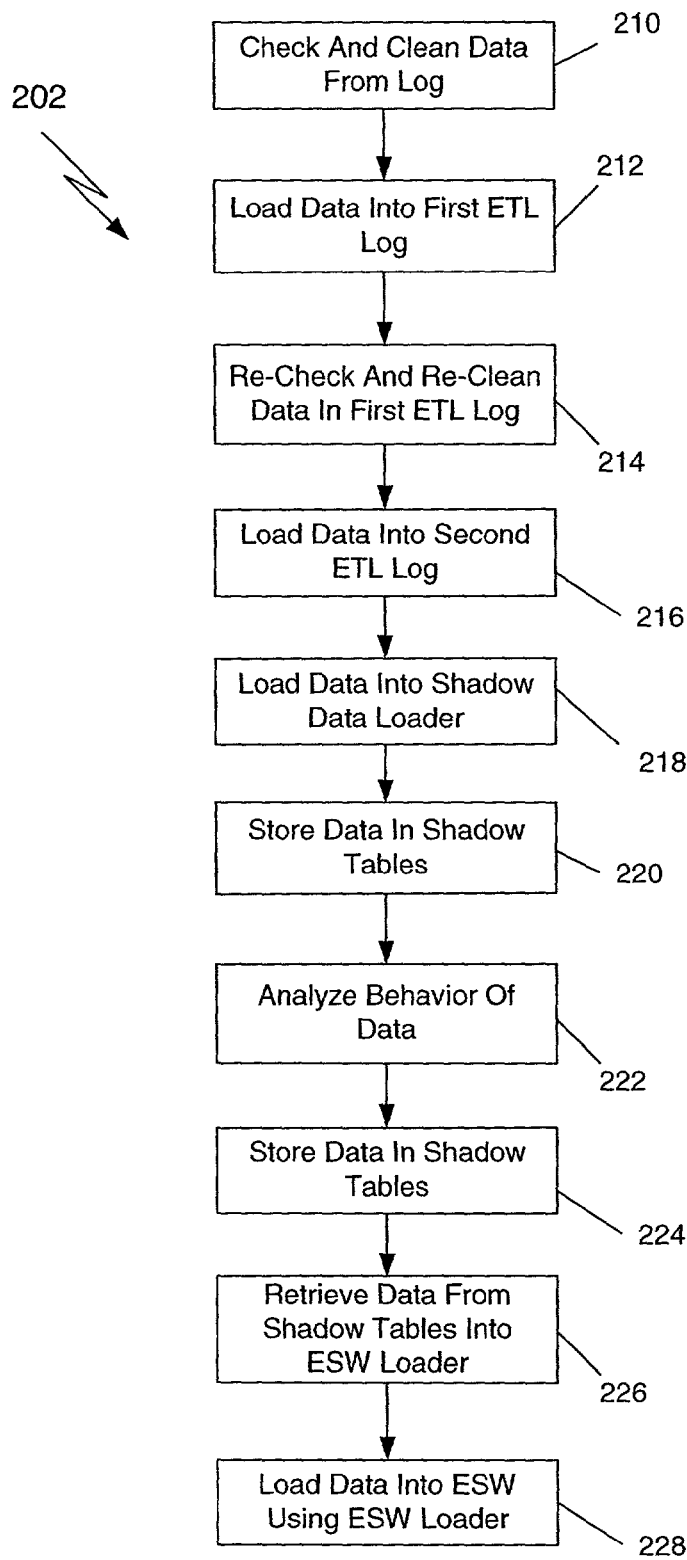

FIGS. 6A and 6B show block diagrams of the operation of two embodiments of extract-transfer-load (ETL) engines 70, 71 used to transfer service data from the log 41 to the warehouse 60. FIGS. 7A and 7B are flow charts showing the methods 200, 202 of transferring data as implemented by the ETL engines 70, 71 of FIGS. 6A and 6B, respectively. FIG. 6A is a simple block diagram of an ETL engine 70 having a multi16 step process, using shadow tables 77 to hold formatted data. Once the data is formatted and stored in the shadow tables 77, it may be simply transferred to the warehouse 60. The use of shadow tables 77 or similar means minimizes the time required to access the warehouse 60, which may be useful if the system does not allow data to be read from the warehouse 60 while new data is transferred to the warehouse 60. Service data is loaded 218 from the log 41 to a shadow data loader 76. The shadow data loader 76 formats the data to fit the data structure used by the warehouse 60 and stores 220 the service data in shadow tables 77. An e-service warehouse (ESW) loader 81 retrieves 226 the data from the shadow tables 77 and loads 228 the data into the warehouse 60. In some embodiments, the process of accessing the data in the log 41 and preparing it for entry into the warehouse 60 may require a significant amount of time and may occupy system resources if the data were loaded directly into the warehouse 60.

FIG. 6B shows a more detailed block diagram of another implementation of an ETL engine 71. Data from the log 41 is checked and cleaned 210 by a first ETL data checker 71 to remove invalid data. For instance, a log 41 may indicate invalid data by giving it a very large value, such as a transaction time of 999 years, when average transaction times are in the range of minutes. The cleaned data are then loaded 212 into a first ETL log 73, and are then re-checked and re-cleaned 214 by a second ETL data checker 74. The ETL engine 71 may be implemented using various numbers of data check steps that may perform one or more checking functions. One check may identify special codes in the data that represent matters other than true data, for example, a date code of 1/1/1111 that might represent an invalid date. One check extracts these special codes so that they are not treated as other data. After the second cleaning, the data are stored 216 to a second ETL log 75. The cleaned data are then loaded 218 into the shadow data loader 76 and stored 220 into shadow tables 79. A behavior analyzer 78 analyzes 222 the service execution by determining values for the fields specified in the quality index records, such as the example shown in FIG. 4A. Based upon the values calculated, the behavior analyzer 78 labels specific transaction instances with the corresponding quality index. After behavior analysis, the data are stored 224 in a second set of shadow tables 79. The ESW loader 81 retrieves 226 the data and loads 228 it into the warehouse 60.

Figure 8:
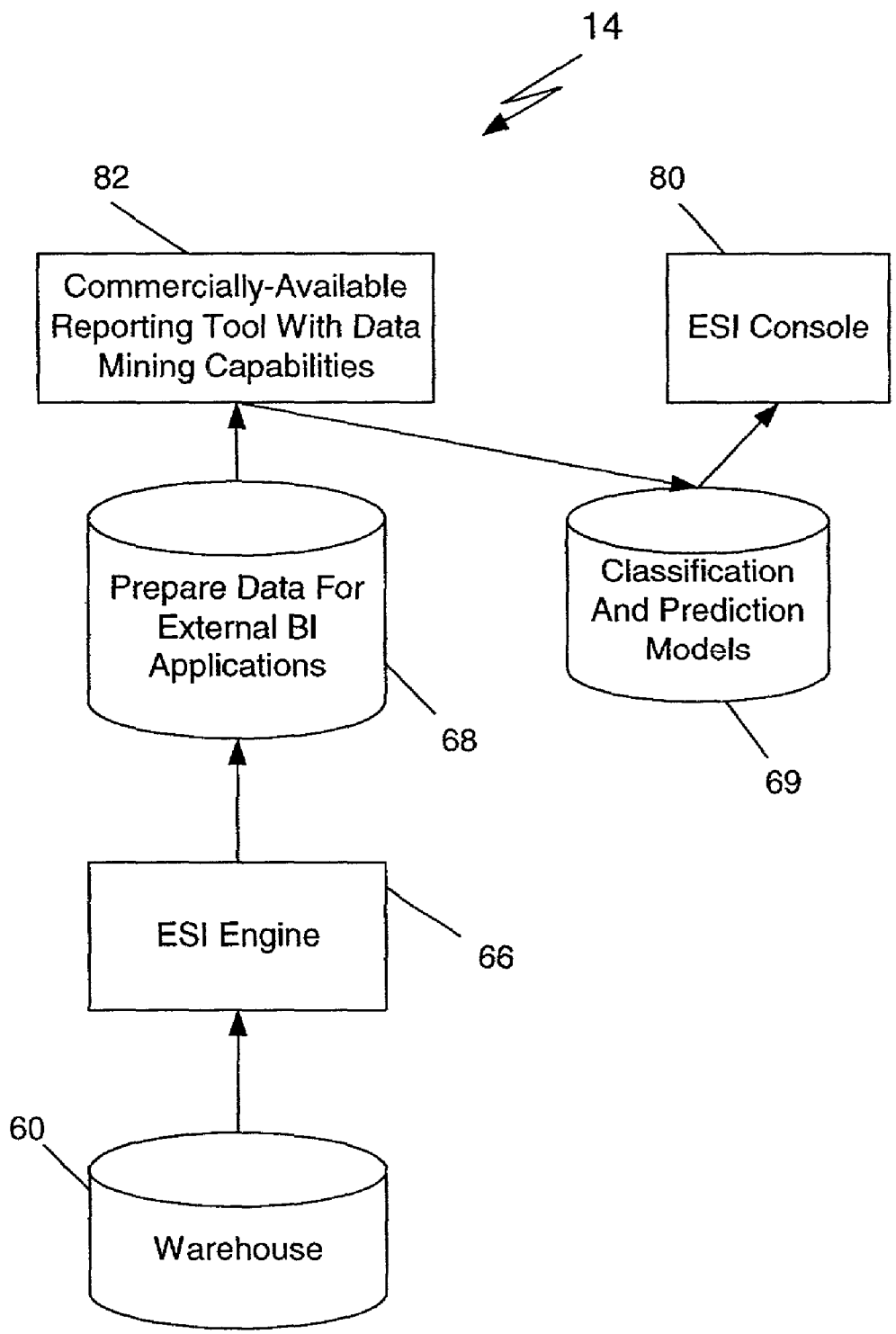
FIG. 8 shows a more detailed block diagram of the analysis system shown in FIG. 2.

FIG. 8 shows a more detailed block diagram of the analysis portion 14 shown in FIG. 2. Data in the warehouse 60 are retrieved by an e-services intelligence (ESI) engine 66 that prepares the data for processing by data mining tools 82. Based on its analysis, the reporting tool 82 also creates classification and prediction models 69. These models 69 suggest how certain e-service transactions will perform based on the analysis of the data. For example, the tool 82 might identify those services delivered on weekends that have low quality. The models 69 may be used to identify ways to restructure the e-service 30-32 to make it perform better. Also, the models 69 may be used dynamically at run-time of the e-service 30-32 to direct the use of resources. For example, if a problem is identified involving certain types of transactions from users 50 at a certain time of the day using certain third-party outsourced services as part of the service, then those transactions might be re-routed to a different third-party provider during peak usage times. In the example of FIG. 8, the prediction models 69 are available to a dedicated ESI console 80 for further analysis and implementation of the models 69 at run-time.

Figure 9:
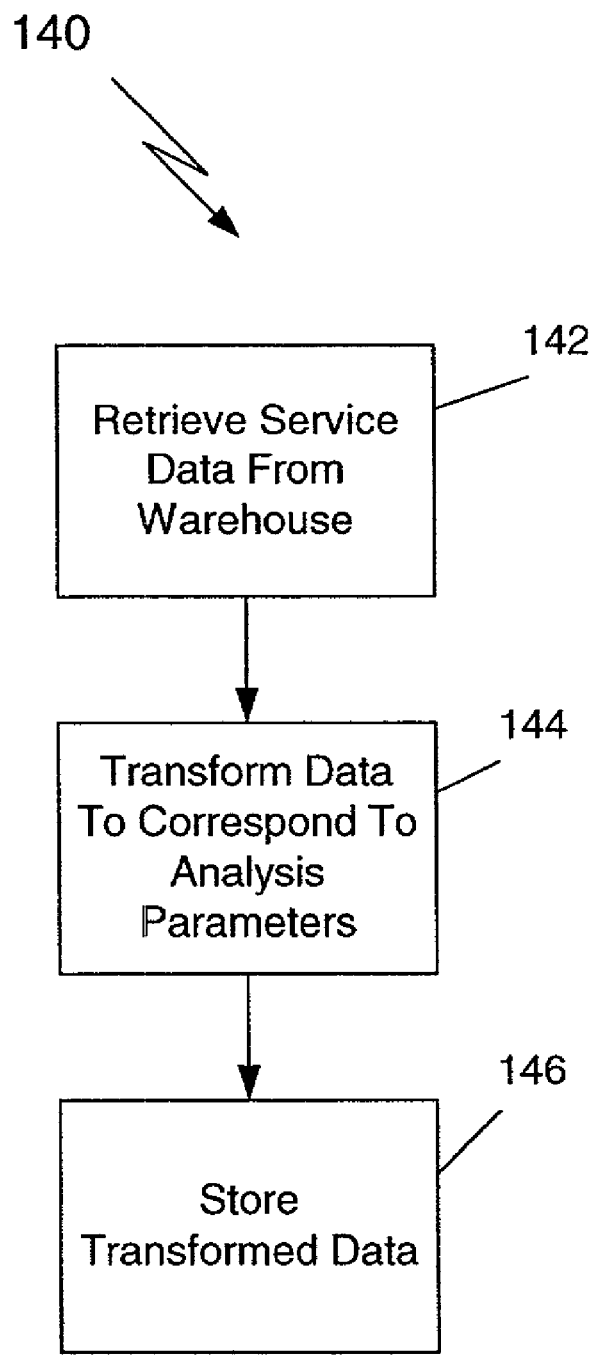
FIG. 9 shows a flow chart of a method of reporting e-service quality.

FIG. 9 shows a more detailed flow chart of the reporting step 140 shown in the flow chart of FIG. 3, as implemented in the block diagram of FIG. 8. The ESI engine 66 retrieves 142 the service data from the warehouse 60 and transforms 144 it to correspond to the analysis parameters specified in the quality index records. The transformed data is stored 146 to a data structure 68, where it may be accessed by a commercially-available reporting tool 82 for analysis. In an alternative embodiment, the ESI engine 66 can directly create analysis and prediction models 69 without requiring a separate data mining tool 82.

Although the present invention has been described with respect to particular embodiments thereof, variations are possible. The present invention may be embodied in specific forms without departing from the essential spirit or attributes thereof. In particular, although the invention has been described with respect to web services, one skilled in the art will recognize that it extends to all electronic services and is not limited to web services or to other services provided by a network. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

What is claimed is:

1. A method of analyzing quality of electronic services hosted by an electronic services platform, comprising:
   specifying at least one quality criterion whose score for a particular transaction indicates quality of execution of an electronic service hosted by a platform with respect to that transaction;
   retrieving electronic service execution data for a plurality of executions of the electronic service, the electronic service execution data comprising a plurality of transaction properties for each transaction executed by the electronic service;
   using a data mining tool to mine the electronic service execution data for the purpose of automatically identifying a hidden pattern related to the quality criterion in the electronic service execution data;
   creating a prediction model, based on the electronic service execution data, for predicting future behavior of the electronic service; and
   using the prediction model during run-time to dynamically direct resources used by the electronic service.

2. The method of claim 1, wherein the electronic service is a web-based electronic service.

3. The method of claim 1, wherein the step of retrieving comprises retrieving execution data from a log maintained by the platform.

4. The method of claim 1, further comprising a step of creating a log by establishing a proxy between the electronic service and the platform.

5. The method of claim 1, further comprising a step of loading the execution data into a warehouse.

6. The method of claim 5, wherein the warehouse stores raw data related to individual executions of the electronic service, aggregated data related to the plurality of executions, and defined functions for analyzing the execution data.

7. The method of claim 6, further comprising a step of preparing the execution data for analysis using an extract-transfer-load engine that checks and, if necessary, cleaning the execution data.

8. The method of claim 7, wherein the step of preparing comprises loading the data into a shadow table, and wherein the step of loading into the warehouse comprises loading the data from the shadow table to the warehouse.

9. The method of claim 1, wherein the at least one quality criterion comprises a quality index based on a combination of characteristics of the execution of the electronic service.

10. The method of claim 1, wherein the at least one quality criterion includes an index related to execution time.

11. The method of claim 1, further comprising a step of formatting the service execution data for analysis by a reporting tool.

12. The method of claim 1, further comprising a step of modifying the electronic service based on the prediction model.

13. The method of claim 1, wherein the transaction properties include identification of at least two of: a location for a client involved in the transaction, a time that the transaction occurred, a type of the transaction and a supplier involved in the transaction.

14. The method of claim 1, further comprising a step of determining causes of poor quality service based on the identified pattern.

15. An apparatus for analyzing quality of electronic services hosted by an electronic services platform, comprising:
    means for specifying at least one quality criterion whose score for a particular transaction indicates quality of execution of an electronic service hosted by a platform with respect to that transaction;
    means for retrieving electronic service execution data for a plurality of executions of the electronic service, the electronic service execution data comprising a plurality of transaction properties for each transaction executed by the electronic service;
    means for using a data mining tool to mine the electronic service execution data for the purpose of automatically identifying a hidden pattern related to the quality criterion in the electronic service execution data;
    means for creating a prediction model, based on the electronic service execution data, for predicting future behavior of the electronic service; and
    means for using the prediction model during run-time to dynamically direct resources used by the electronic service.

16. A storage device or a computer memory storing computer-executable process steps for analyzing quality of electronic services hosted by an electronic services platform, said process steps comprising steps of:
    specifying at least one quality criterion whose score for a particular transaction indicates quality of execution of an electronic service hosted by a platform with respect to that transaction;
    retrieving electronic service execution data for a plurality of executions of the electronic service, the electronic service execution data comprising a plurality of transaction properties for each transaction executed by the electronic service;
    using a data mining tool to mine the electronic service execution data for the purpose of automatically identifying a hidden pattern related to the quality criterion in the electronic service execution data;
    creating a prediction model, based on the electronic service execution data, for predicting future behavior of the electronic service; and
    using the prediction model during run-time to dynamically direct resources used by the electronic service.

17. The method of claim 1, wherein the transaction properties include at least one of a time that the transaction occurred and a supplier involved in the transaction.

18. The method of claim 1, wherein the electronic service execution data results from actual customer transactions that have occurred.

* * * * *

UNITED STATES PATENT AND TRADEMARK OFFICE
CERTIFICATE OF CORRECTION

PATENT NO.         : 7,403,985 B2                                              Page 1 of 1
APPLICATION NO.    : 09/985081
DATED              : July 22, 2008
INVENTOR(S)        : Fabio Casati et al.

It is certified that error appears in the above-identified patent and that said Letters Patent is hereby corrected as shown below:

On the title page, item (57), under "Abstract", in column 2, lines 1-21, delete
"A method is disclosed for analyzing quality of an electronic service..............
.....................................run-time to optimize e-service execution." and
insert -- The quality of electronic services, hosted by an electronic services platform, is analyzed by using a data mining tool to analyze electronic service execution data for various executions of the electronic service. Preferably, such analysis is performed in view of specified parameters related to quality of execution. Patterns of transactions are identified based on quality level and those patterns are associated with properties of the transactions. As a result, in certain cases it is possible to determine causes of poor quality service and/or to create a prediction model for predicting future behavior of the electronic service. In certain cases, such a prediction model may be used to improve the electronic service. --, therefor.

In column 7, line 57, delete "multi16 step" and insert -- multi-step --, therefor.

Signed and Sealed this

Twenty-eighth Day of April, 2009

JOHN DOLL
*Acting Director of the United States Patent and Trademark Office*